United States Patent [19]

Higashino et al.

[11] Patent Number: 5,143,402
[45] Date of Patent: Sep. 1, 1992

[54] TILT TYPE STEERING DEVICE

[75] Inventors: Kiyoharu Higashino, Gunma; Sakae Matsumoto, Takasaki; Hiroshi Kihara, Maebashi, all of Japan

[73] Assignee: Nippon Seiko Kabushiki Kaisha, Tokyo, Japan

[21] Appl. No.: 663,459

[22] Filed: Mar. 4, 1991

[30] Foreign Application Priority Data

Mar. 6, 1990 [JP] Japan .............. 2-21850[U]

[51] Int. Cl.⁵ .............................. B62D 1/18
[52] U.S. Cl. ...................... 280/775; 74/493
[58] Field of Search ................ 280/775; 74/493

[56] References Cited

U.S. PATENT DOCUMENTS 4,892,330  1/1990  Beauch ..................... 74/493
4,938,093  7/1990  Matsumoto et al. ........ 74/493
5,078,022  1/1992  Ichikawa ............... 280/775 X

FOREIGN PATENT DOCUMENTS 0053962  5/1981  Japan ..................... 74/493
62-4470  1/1987  Japan .

Primary Examiner—Charles A. Marmor
Assistant Examiner—Tamara L. Graysay
Attorney, Agent, or Firm—Shapiro and Shapiro

[57] ABSTRACT

The tilt position of a steering device can be freely adjusted by changing the engagement position of facing sets of gear teeth. A pair of supporting plates each provided with a circular arc-shaped long hole is attached to the lower part of a steering column, and a shaft is received and freely movable (by operation of a tilt lever) within the long holes. The shaft is movable between positions for engagement and release of the gears, while being supported within the long holes of the plates.

6 Claims, 8 Drawing Sheets

TILT TYPE STEERING DEVICE

BACKGROUND OF THE INVENTION

1. Field of the Invention

The present invention relates to tilt type steering devices, and is more particularly concerned with a tilt type steering device having an improved structure for supporting the steering column.

2. Related Background Art

There is already known a steering wheel height adjusting device or a so-called tilt type steering device wherein the height of the steering wheel can be changed according to physical characteristics, driving posture, etc. of the driver.

One such tilt type steering device is disclosed in U.S. Pat. No. 4,594,909.

The tilt type steering device described therein is of the so-called head-swinging type and is illustrated in FIGS. 14-17. A steering column 2 cylindrically formed to receive a steering shaft 1 is divided into two parts, namely, a lower steering column 3 and an upper steering column 4. The two steering columns 3 and 4 are connected at a supporting bracket 5 fixed on the vehicle body, such as at the bottom surface of a dashboard 8. The upper steering column 4 is pivotally supported from the supporting bracket 5 by a pair of pins 6,6, so as to be swingable about an axis defined by the pins (the tilt axis).

There is also provided a device which can be freely engaged or disengaged by the tilt lever 7 which swings around the tilt axis, so that the upper steering column 4 may be connected to the supporting bracket 5 (disabling the swinging of the upper steering column 4), or released from the supporting bracket 5 (enabling the swinging of the upper steering column 4).

A first gearing member 9 is fixed to the bottom of the upper steering column 4. A convex bottom surface of this first gearing member 9 is formed with first gear teeth 10 along a circular arc around the center of the tilt axis.

One end (left end in FIGS. 15 and 17) of a second gearing member 12 is pivotally supported from the supporting bracket 5 by a pin 11, so as to be pivotable on an axis defined by the pin 11. The upper edge of the other end (the upper edge at the right end of FIG. 15) of the second gearing member 12 is formed with second gear teeth 13. The second gearing member 12 pivots according to the swinging of tilt lever 7 to bring gear teeth 13 into and out of engagement with the first gear teeth 10.

A shaft 14 spanning the lower ends of the tilt lever 7 supports a roller 15, the upper portion thereof being in contact with the lower surface of the second gearing member 12.

A pin 18 projection from one side of the second gearing member 12 is engaged with an inclined long hole 17 formed in a swinging plate 16 fixed to the tilt lever 7.

In the foregoing construction, when the tilt lever 7 swings anticlockwise in FIG. 15, the roller 15 retreats from the lower part of the second gearing member 12 (the right end section in FIG. 15) and simultaneously, due to the engaging of the inclined long hole 17 and pin 18, the other end of the second gearing member 12 is displaced downward.

As a result, the second gear teeth 13 and the first gear teeth 10 are disengaged. The upper steering column 4 is thus free to swing about the tilting axis (within a restricted range of displacement allowed by a pin 19 projecting from a side of the upper steering column 4 into a circular arc-shaped long hole 20 formed in the supporting bracket 5) to adjust the height of steering wheel fixed to the end of the steering shaft 1.

When the height of the steering wheel is adjusted as aforesaid, the hand is taken off the tilt lever 7. Then the tilt lever 7 swings in clockwise direction in FIG. 15, due to pulling force of a tension spring 21, and roller 15 moves under the geared end the second gearing member 12, pushing such end of the second gearing member 12 upward to engage the second gear teeth 13 with the first gear teeth 10 so that the upper steering column 4 cannot turn around the tilt axis.

As a result, the steering wheel is held at the position set by adjustment of height. Under such state, an elastic force tending to cause clockwise swinging of tilt lever 7 in FIG. 15 is exerted on the tilt lever 7 by the tension spring 21 Therefore, the roller 15 cannot inadvertently retreat from the lower side of the second gearing member 12.

In the case of the conventional tilt type steering device which is constructed and used as aforesaid, the ends of the shaft 14 are suspended by a pair of suspension arms 22, 22, the upper ends of which are supported by the pins 6, 6. This increases the complexity of the device. Moreover, in order to secure sufficient strength of engagement of the first gear teeth 10 and the second gear teeth 13 and to secure sufficient rigidity for shaft 14, the components must be substantial. This increases the size of the device. The increased complexity and size naturally increase the cost of the device as well.

Another known head-swinging type tilt steering device is disclosed in Japanese Utility Model Appln. Laid-Open No. 62-4470. This device suffers from similar disadvantages to those above-discussed.

SUMMARY OF THE INVENTION

An object of the present invention, therefore, is to provide a tilt type steering device which has both a simple construction and improved rigidity and which can be manufactured at lower cost.

The tilt type steering device of the present invention may comprise, similarly to the aforesaid conventional tilt type steering device, a supporting bracket fixed to the vehicle body, a steering column having one end pivotally supported from the supporting bracket on a first lateral axis, a first gearing member fixed to the bottom of the steering column and having a convex bottom surface formed with first gear teeth along a circular arc around the first lateral axis, a second gearing member having one end pivotally supported from the bracket on a second lateral axis and formed with second gear teeth which can be freely engaged with or disengaged from the first gear teeth, and a swingable tilt lever.

Further in the case of the tilt type steering device of the present invention, a pair of supporting plates are fixed at the right and left sides of the first gearing member, and each supporting plate has a long hole the lower edge of which conforms to a circular arc around the first lateral axis.

A shaft is provided which spans the two long holes and which is disposed to engage a bottom surface of the second gearing member.

In one preferred embodiment, an end of the shaft is connected to the tilt lever so that the first and the second gear teeth are engaged o disengaged according to the swinging of the tilt lever.

In another preferred embodiment, the shaft is connected to a separate swinging plate pivotally supported on the first lateral axis (or on a third lateral axis parallel to the first lateral axis), instead of being connected to tilt lever. There is additionally provided a hook plate pivotally supported on the second lateral axis (or a fourth lateral axis parallel with the second later axis). The hook plate has a hook which engages with and disengages from the shaft to prevent or allow disengagement of the gears according to the state of the tilt lever. A guide pin is connected to one of the hook plate and the tilt lever and received in a guide slot of the other of the hook plate and tilt lever, and the guide slot is configured such that the hook engages with the shaft at the time of engaging the first and second gear teeth.

According to the tilt type steering device of the present invention so composed as aforesaid, when the tilt lever swings, the shaft shifts along the long holes of the supporting plates and the upper end of the shaft slides along the engaging surface formed at the bottom of the second gearing member, so that the second gearing member swings around the second lateral axis.

As a result, the second gear teeth are brought into and out of engagement with the first gear teeth in accordance with the movement of the tilt lever.

Since the supporting plates having long holes are fixed to the right and left sides of the first gearing member, the shaft is supported but a short distance from the portion beneath the second gearing member. It is therefore possible to secure the necessary strength of engagement of the gearing teeth without specially increasing the rigidity of the shaft.

BRIEF DESCRIPTION OF THE DRAWINGS

FIG. 1 is a top plan view showing the crosssection of a part thereof;

FIG. 2 is the lateral cross-sectional view;

FIG. 3 is the bottom plan view;

FIG. 4 is the cross-sectional view along the line 4—4 of FIG. 2;

FIG. 5 is the cross-sectional view along the line 5—5 of FIG. 4 in the state of gearing of the first and the second gear teeth, with FIG. 6 being a similar view showing the state where the gearing is disengaged;

FIG. 7 is a top plan view showing the crosssection at one part;

FIG. 8 is the lateral cross-sectional view;

FIG. 9 is the bottom plan view;

FIG. 10 is the cross-sectional view along line 10—10 of FIG. 8;

FIG. 11 is the cross-sectional view along line 11—11 of FIG. 10 and shows the state of gearing of the first and second gear teeth, with FIG. 12 being a similar view during the process of disengagement of gearing, and FIG. 13 showing the completely disengaged state.

FIG. 14 being a lateral elevation view;

FIG. 15 being a partial vertical cross-sectional view showing on a larger scale the section E of FIG. 14;

FIG. 16 being the cross-sectional view along line 16—16 of FIG. 15; and

FIG. 17 being the view along arrow G of FIG. 15.

DETAILED DESCRIPTION OF THE PREFERRED EMBODIMENTS

Figure 1:
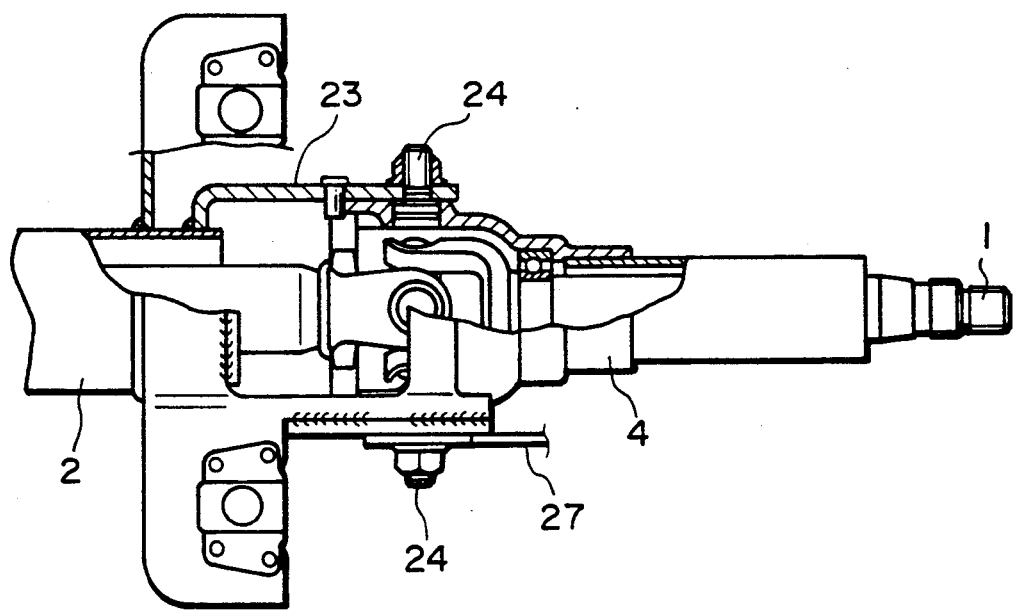
FIGS. 1-6 show a first embodiment of the tilt type steering device of the present invention.

FIGS. 1-6 show a first embodiment of the invention including an upper steering column 4, one end of which is pivotally supported from a supporting bracket 23 by a pair of pins 24, 24 provided at left and right sides of the supporting bracket 23 and defining a first lateral axis (the tilt axis). The supporting bracket 23 is fixed to the vehicle body On a bottom portion of the upper steering column 4, a first gearing member 9 is fixed by welding (in the case when it is made of metal) or by being formed into one unit with the upper steering column 4 (in the case when it is made of plastic). The lower surface of the first gearing member 9 has first gearing teeth 10 formed along a circular arc around the first lateral axis, defined by pins 24, 24.

A second lateral axis is defined by a shaft 26 received by a bracket 25 which is a part of the supporting bracket 23 and fixed at front below (left below in FIG. 2) pins 24, 24. The shaft 26 supports a first end of a second gearing member 12 for pivotal movement about the second lateral axis. At the upper edge of a second (right) end of the second gearing member 12 there are formed second gear teeth 13, which may be engaged with or disengaged from the first gear teeth 10 by operation of a tilt lever 27 to be explained later.

In the tilt type steering device of the present invention, a pair of supporting plates 28, 28 are fixed at both sides of the first gearing member 9 by welding (when the first gearing member 9 is made of metal) or by rivet (when the first gearing member 9 is made of synthetic resin). Circular arc-shaped elongate holes 31 31 are formed in the respective supporting plates 28, 28 around the first lateral axis defined by pins 24, 24 and a shaft 30 is received in the long holes 31, 31 of the two supporting plates 28, 28.

One end of the said shaft 30 (left end of FIG. 4) is fixed by being connected to the lower end of the tilt lever 27. The upper end of the tilt lever 27 is pivotally supported on the first lateral axis by pins 24, 24 and, therefore, with the swing of the tilt lever 27 around the first lateral axis, the shaft 30 moves along the long holes 31, 31.

The second gearing member 12 is configured such that the part facing the upper end of the shaft 30 provides an engaging surface 32 which inclines upward toward the second end (right end in FIGS. 3, 5, and 6) of the member 12. With movement of the shaft 30 along the long holes 31, the upper edge of shaft 30 slidingly contacts with the engaging surface 32, and the second gearing member 12 swings around the second lateral axis defined by shaft 26.

When the tilt lever 27 is made to swing around the first lateral axis, shaft 30 deflects and the second gearing member 12 swings around the second lateral axis, whereby the first gear teeth 10 may be engaged with or disengaged from the second gear teeth 13. A roller may be provided at the intermediate part of the shaft 30 for engaging the surface 32, if desired.

Figure 2:
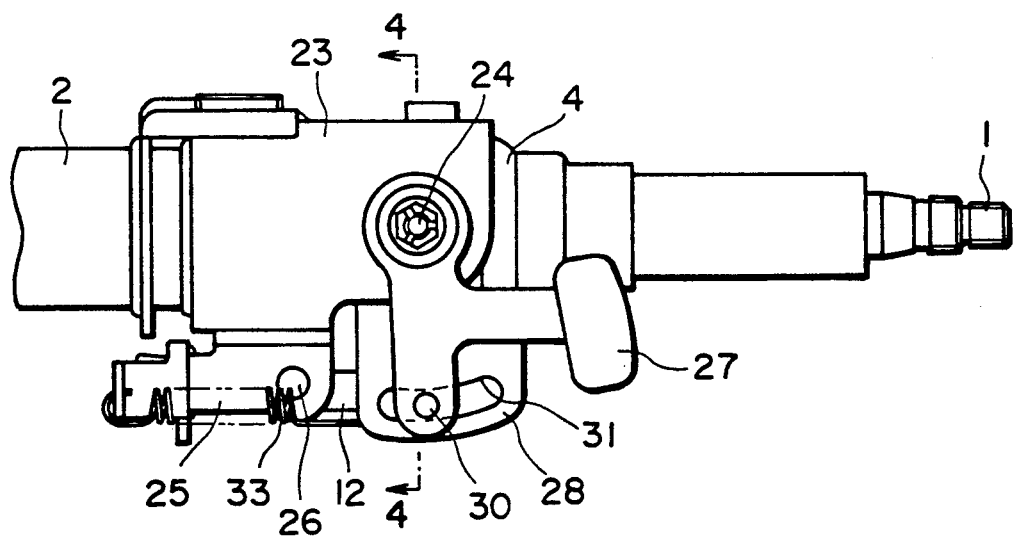
Figure 3:
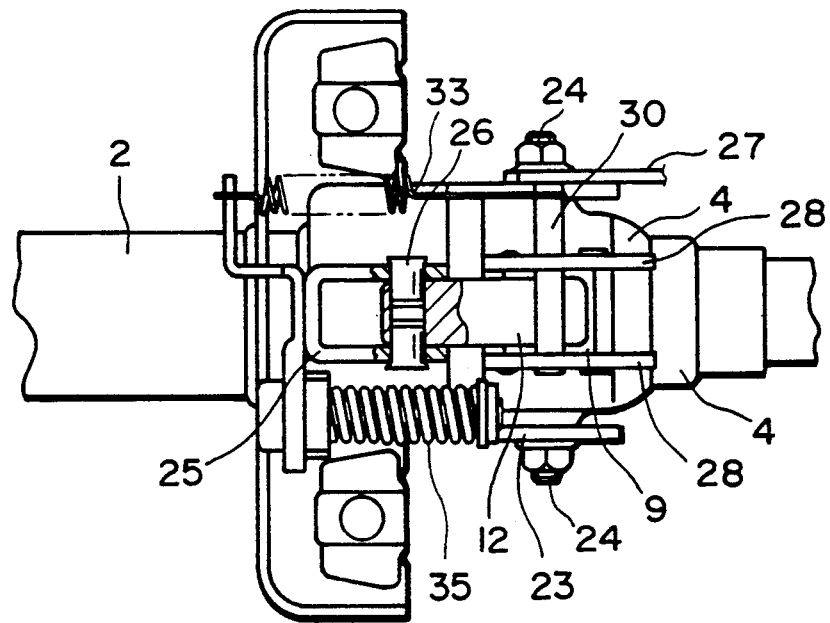
Figure 4:
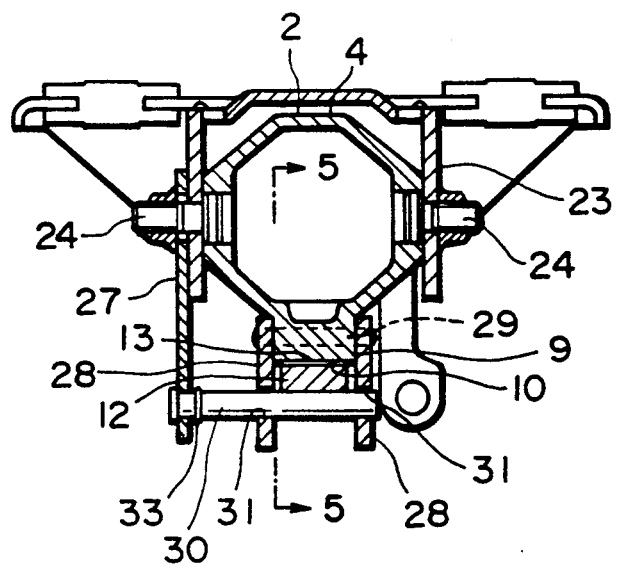

A tension spring 33 is provided in between the shaft 30 connected and fixed to the tilt lever 27 and the bracket 25, whereby an elastic force tending to cause clockwise swing in FIG. 2 is exerted on the tilt lever 27 to keep the shaft 30 underneath the engaging surface 32 unless external force is applied to the tilt lever.

Further, between the bracket 25 and the bottom surface of a projecting part at one end (left end in FIGS. 5-6) of the second gearing member 12, there is provided a compression spring 34. The compression spring 34 imparts an elastic force tending to pivot the second gearing member 12 clockwise (in FIGS. 5-6), and thus to disengage the first gear teeth 10 and the second gear teeth 13 in the absence of a counterforce.

In the case of the illustrative embodiment, a compression spring 35 is provided in between a part fixed to the supporting bracket 23 and a part fixed to the upper steering column 4, and such compression spring 35 exerts an elastic force in the direction in which the rear end (right end in FIGS. 1-3) of the upper steering column 4 rises. This reduces the effort required to adjust the elevation of the steering wheel.

In the case of the tilt type steering device of the present invention as explained above, the force of the compression spring 34 is sufficiently weaker than the anticlockwise force loaded on the second gearing member 12 by the tension spring 33 via shaft 30 and the engaging surface 32. Therefore, unless an external force (manual operating force) is applied to the tilt lever 27, the second gearing member 12 is urged anti-clockwise in FIGS. 5-6 so that the second gear teeth 13 are held in engagement with the first gear teeth 10 and there is no chance that the steering wheel will inadvertently ascend or descend due to disengagement of the gearing of the first and second gear teeth 10 and 13.

To adjust the height of steering wheel according to the physical constitution of an operator, the tilt lever 27 swings anticlockwise in FIG. 2 around the first lateral axis.

Figure 5:
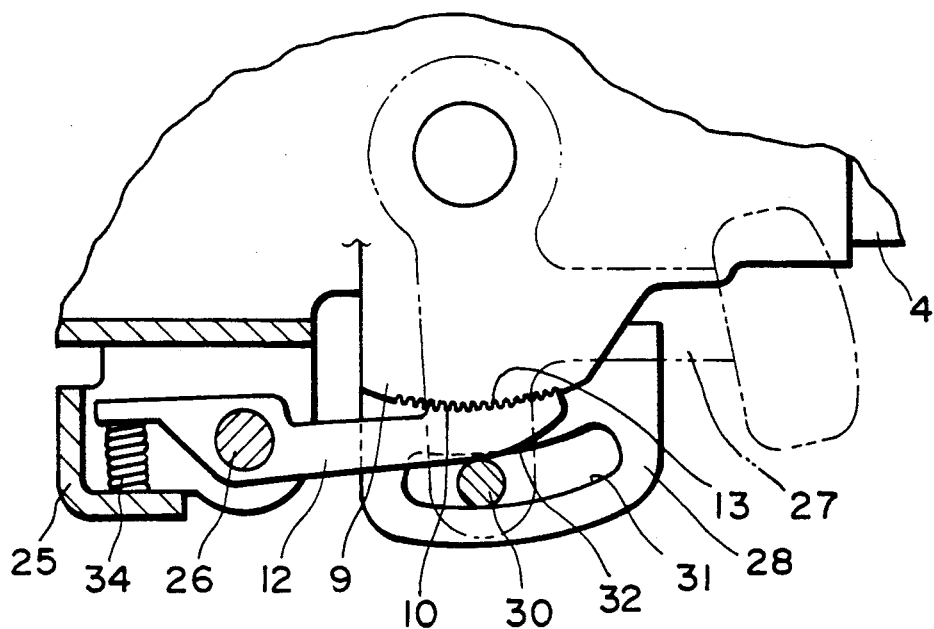
Figure 6:
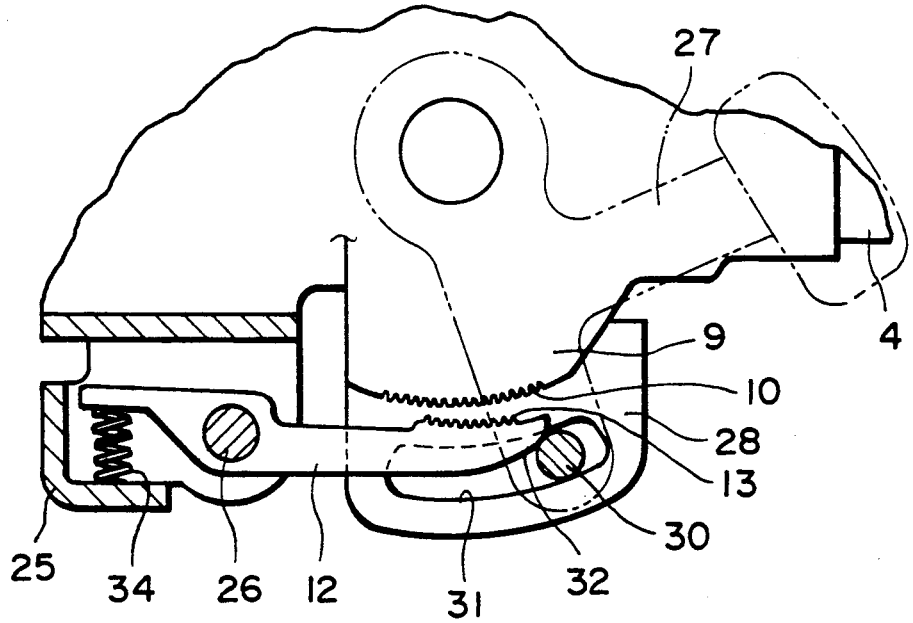
Figure 7:
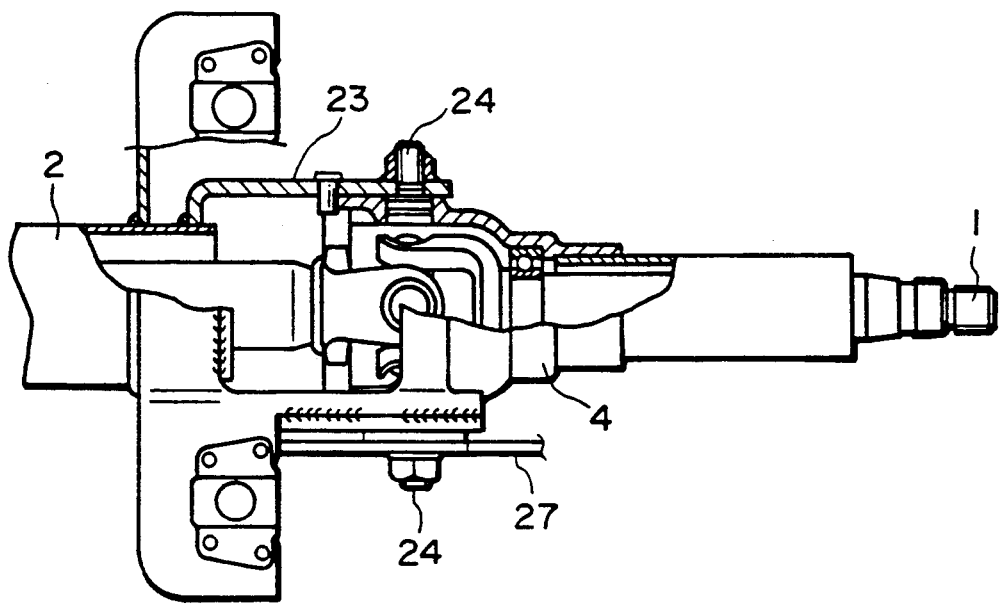
FIGS. 7-13 show a second embodiment of the present invention.

With the anticlockwise swing of tilt lever 27, the shaft 30 connected and fixed at the lower end of tilt lever 27 tends to slip out from under the engaging surface 32 of the second gearing member 12 as shown in FIG. 6 and the second gearing member 12 swings clockwise in FIGS. 2, 5 and 6 around the second lateral axis due to the elastic force of the compression spring 34.

As the result of such swinging, the engagement of the second gear teeth 13 and the first gear teeth 10 is released.

In the state where the engagement of the first and the second gear teeth is released, the upper steering column 4 swings upward around the first lateral axis due to the elastic force of the compression spring 35. The height of the steering wheel can be properly adjusted by depressing the steering wheel resisting against the elastic force.

When the height of the steering wheel is adjusted as above, the said tilt lever 27 and the shaft 30 connected and fixed to the tilt lever 27 are caused to swing clockwise in FIGS. 2, 5, and 6 by the elastic force of the tension spring 33. The second gear teeth 13 are thus engaged with the first gear teeth 10 again as shown in FIG. 5 so that the upper steering column 34 cannot turn around the first lateral axis.

As a result, the steering wheel is held at the position where the height has been adjusted. Under such state, the tilt lever 27 bears the elastic force of tension spring 33, and the gear teeth 10 and 13 cannot be inadvertently disengaged, as explained before.

It will be appreciated that in the above construction, engagement of long holes 31, 31 and shaft 30 is maintained because the respective lower edges of long holes 31, 31 form a circular arc shape around the first lateral axis. Thus, the lower edge of the shaft 30 slidingly contacts the lower edges of long holes 31, 31.

FIGS. 7-13 show a second embodiment of the present invention.

In the case of the present embodiment, the member used to connect and fix the shaft 30 is a swing plate 38.

Figure 11:
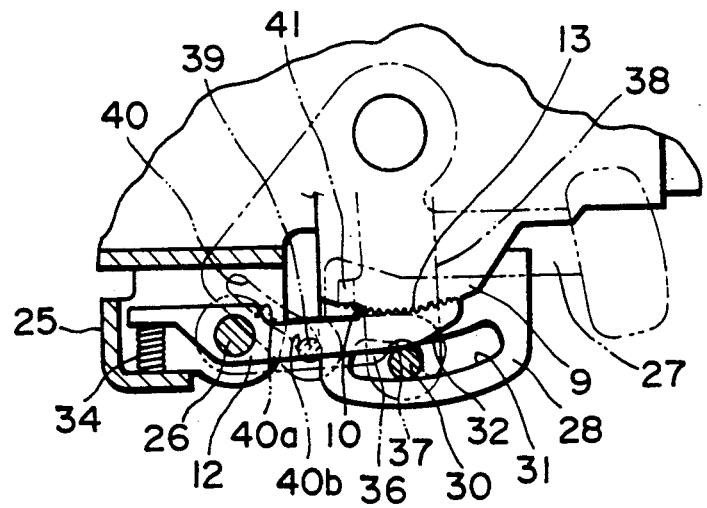
Figure 12:
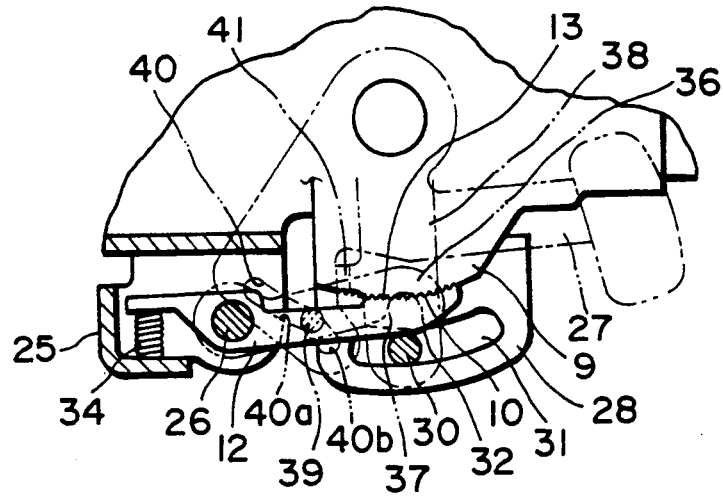

The upper end of this swing plate 38 is supported about one of the pins 24 such that it can swing freely independent from the tilt lever 27 about the first lateral axis. The shaft 30 is connected and fixed to the lower end of the swing plate 38. In between the shaft 30 and the bracket 25 is provided a tension spring 33 which has sufficient elastic force, so that, unless external force is applied, the shaft 30 is held beneath engaging surface 32 of the second gearing member 12 and (as shown in FIGS. 11-12 described later) the first and second gear teeth 10 and 13 engage with each other.

In the case of the present embodiment, the base end of a hook plate 36 (left end in FIGS. 9, 11, 12, and 13) is pivotally supported by the shaft 26 on the second lateral axis. The hook plate 36 can freely swing independently from the second gearing member 12 and at the time of engagement of the first and second gear teeth 10 and 13, a hook 37 formed at the front end of the hook plate 36 (the right end in FIGS. 9, 11, 12 and 13) engages with the intermediate part of the shaft 30 to prevent slip-out of the shaft 30 from beneath the gearing surface 32. The front end of the hook plate 36 is provided with a U-shaped notch opening downward to form the hook 37, and the displacement of shaft 30 becomes impossible when the hook plate 36 swings downward and the hook 37 engages with the shaft 30.

To the side of the hook plate 36, the base end (lower end in FIG. 9) of a horizontal guide pin 39 is connected and fixed. The opposite end (upper end in FIG. 9) of the guide pin 39 is engaged with a long guide hole (slot) 40 formed at the side of an end of the tilt lever 27.

The shape of the long guide hole 40 is composed of a part in the form of a circular arc 40a around the first lateral axis and an inclined part 40b which continues from an end of circular arc 40a and inclines in the direction away from the first lateral axis 24 moving away from circular arc 40a. The guide hole 40 is thus configured so that the hook 37 and shaft 30 engaged with each other at the time of engagement of the first and second gear teeth 10 and 13.

At the front edge (left edge in FIGS. 8, 11, 12 and 13) of an intermediate part of the swing plate 38, there is formed an abutment 41. When tilt lever 27 swings anticlockwise by a predetermined amount, the rear edge of tilt lever 27 comes into contact with the abutment 41, and tilt lever 27 and swing plate 38 swing conjointly.

In the following, there will be explained the function of the tilt type steering device of the second embodiment of the present invention constructed as above.

Figure 8:
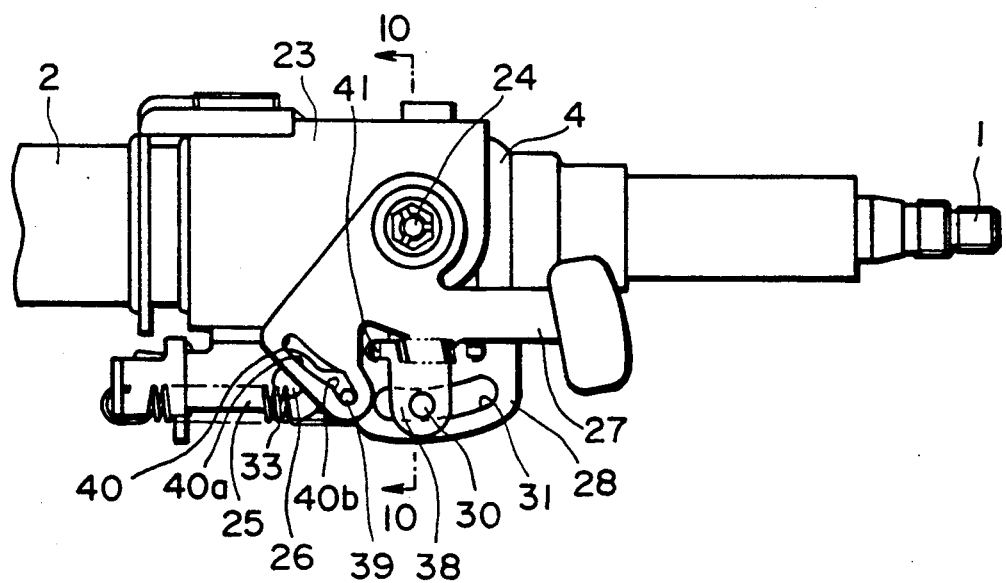
Figure 9:
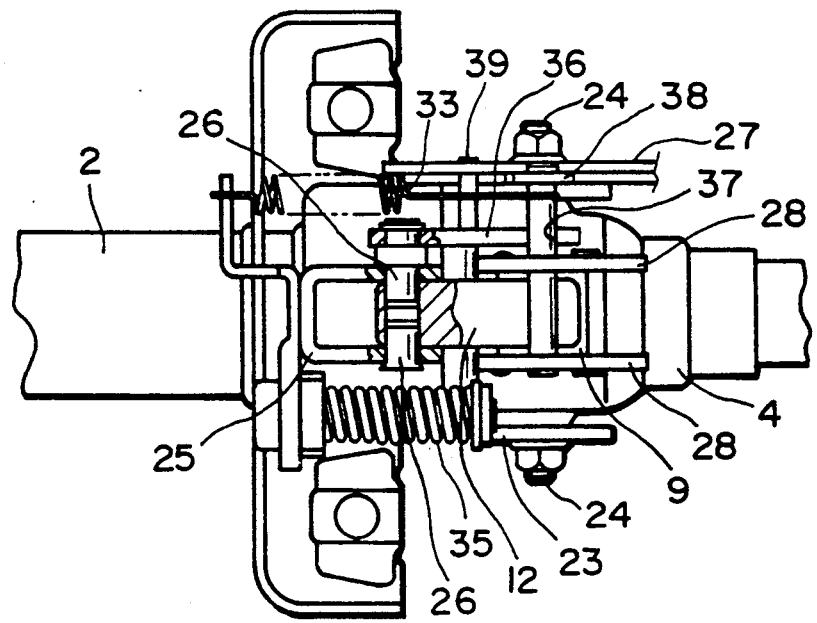
Figure 10:
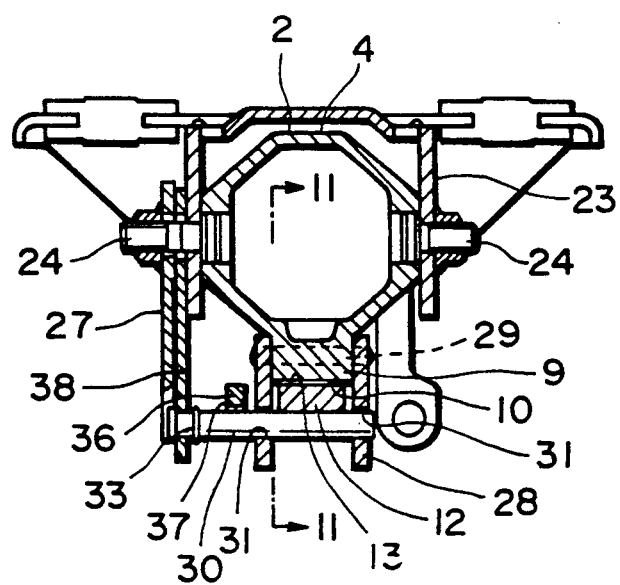

Similarly to the first embodiment, the shaft 30 and the swing plate 38 connected and fixed to shaft 30 are urged clockwise in FIG. 8 by the elastic force of tension spring 33 to hold the shaft 30 underneath the engaging surface 32 formed at the bottom of the front end of the second gearing member 12. The second gearing member 12 is thus urged anticlockwise in FIGS. 11-13 so that the second gear teeth 13 engage with the first gear teeth 10 of the first gearing member 9.

When the height of steering wheel is adjusted according to the physical constitution etc. of the operator, the tilt lever 27 is made to swing anticlockwise in FIG. 8 around the first lateral axis.

With the anticlockwise swing of tilt lever 27, first, as shown in FIG. 11, the guide pin 39 located at the end of the inclined part 40b of the long guide hole 40 moves up to the junction between the inclined section 40b and circular arc section 40a as shown in FIG. 2. By this movement of guide pin 39, the front end of the hook plate 36 is pushed upward, and the hook 37 formed at front end of the hook plate 36 is disengaged from shaft 30, whereby it becomes possible for shaft 30 to slip out from underneath the second gearing member 12.

Figure 13:
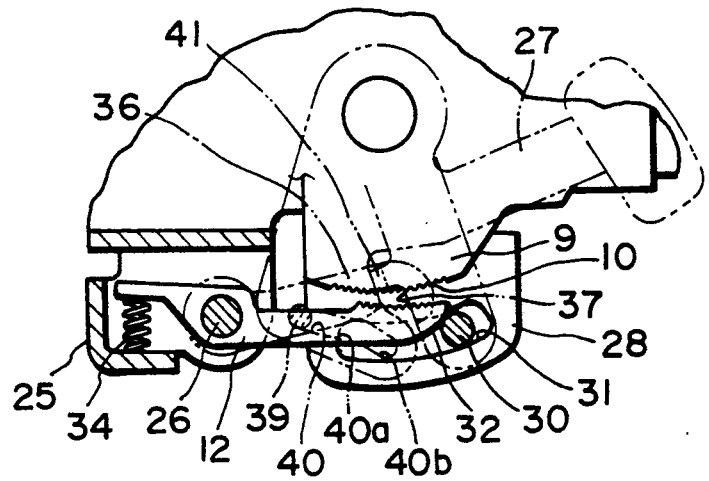
Figure 14:
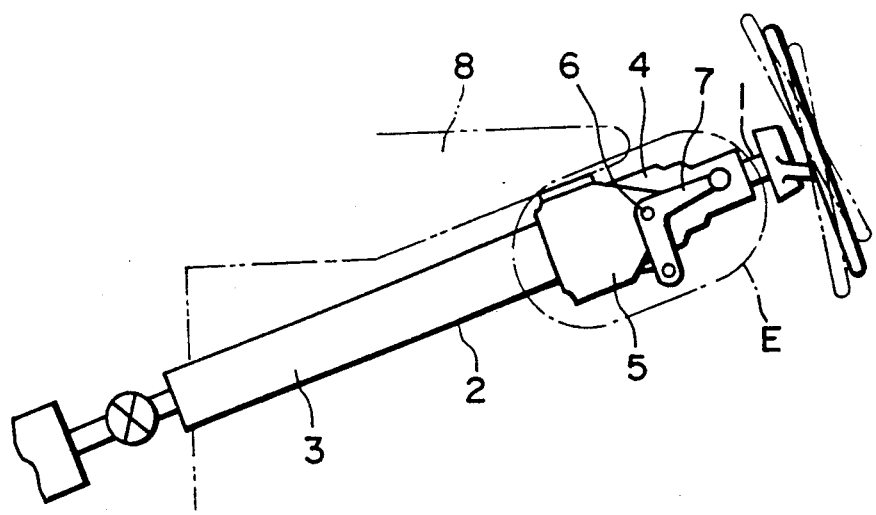
FIGS. 14-17 show an example of the conventional tilt type steering device.
Figure 15:
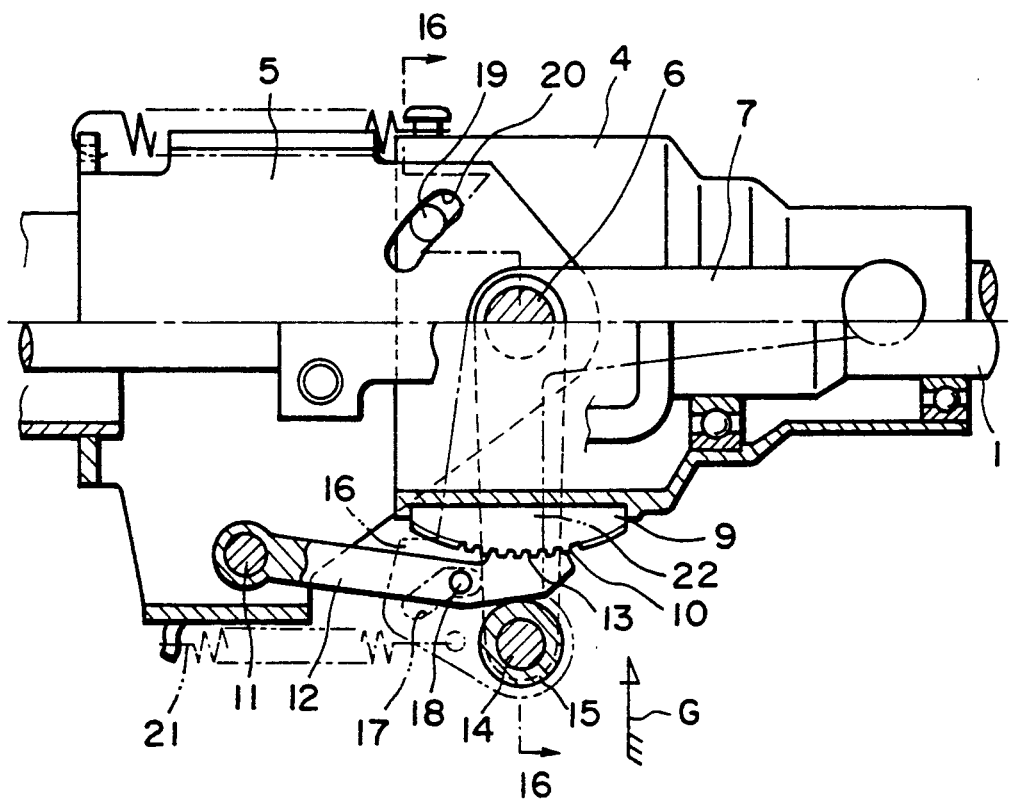
Figure 16:
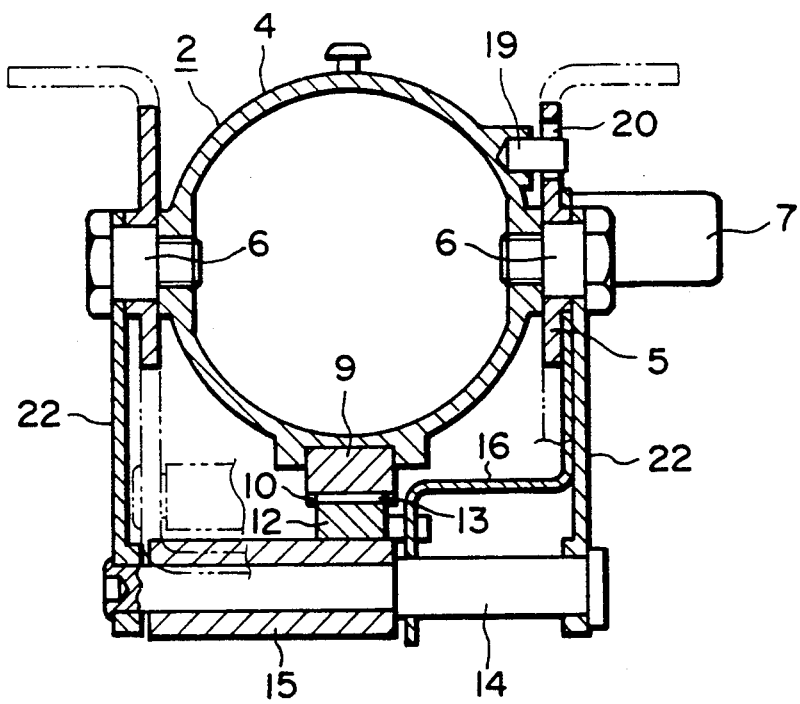
Figure 17:
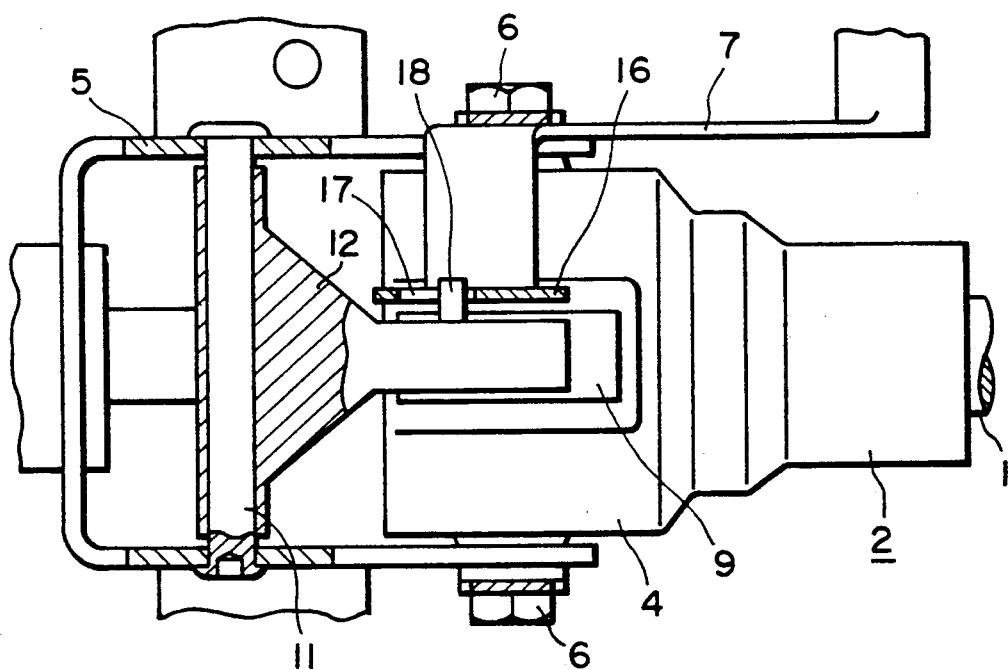

When tilt lever 27 is caused to swing further anticlockwise, the rear edge of tilt lever 27 comes into contact with abutment 41 and together with tilt lever 27, the swing plate 38 swings anticlockwise and the shaft 30 connected and fixed to the lower end of the swing plate 38 slips out from beneath the engaging surface 32 of the second gearing member 12, as shown in FIG. 13.

As a result, the second gearing member 12 swings clockwise in FIGS. 11-13 around the second lateral axis due to the elastic force of the aforesaid compression spring 34. The second gear teeth 13 and the first gear teeth 10 are thereby disengaged.

When the height of steering wheel is adjusted as desired, the force controlling the said tilt lever 27 is released. The swing plate 38 and the shaft 30 connected and fixed to swing plate 38 are then caused to swing clockwise in FIGS. 11-13 by the elastic force of the tension spring 33. This brings the second gear teeth 13 back into engagement with the first gear teeth 10, so that the upper steering column 4 cannot turn around the first lateral axis and the steering wheel is held at the position where its height has been adjusted. In addition, guide pin 39 fixed to the hook plate 36 moves to the end of the inclined part 40b of long guide hole 40. With this movement of guide pin 39, the hook 37 at the front end of hook plate 36 again engages with the shaft 30 as shown in FIG. 11. Thus displacement of shaft 30 is prevented and the engagement of the two gear teeth 10 and 13 cannot be released inadvertently.

In the case of the embodiment shown, the swing plate 38 is pivotally supported on the first lateral axis together with the tilt lever 27. However, the swing plate 38 may be pivotally supported on a third lateral axis provided separately from the first lateral axis. Likewise, it is also possible to pivotally support the base end of the hook plate 36 on a fourth lateral axis provided separately from the second lateral axis.

With the tilt type steering device of the present invention, sufficient strength is obtained without the need to significantly increase the rigidity of constituent parts, and therefore it is possible to reduce the cost and size of tilt type steering equipment.

What is claimed is:

1. A tilt type steering device comprising:
   supporting bracket means fixed to a vehicle body;
   a steering column having one end which is pivotally supported from said supporting bracket means on a first lateral axis;
   a first gearing member fixed to a bottom portion of said steering column and having a convex bottom surface with first gear teeth formed along a circular arc around said first lateral axis;
   a second gearing member having one end which is pivotally supported from said supporting bracket means on a second lateral axis and another end having an upper surface with second gear teeth engageable with and disengageable from said first gear teeth;
   tilt lever means swingably movable for causing said first gear teeth and said second gear teeth to be brought into and out of engagement with each other;
   a pair of supporting plates fixed to opposite lateral sides of said first gearing member and each having an elongate hole with a lower edge forming a circular arc shape around said first lateral axis; and
   shaft means connected to said tilt lever means for movement therewith and spanning said elongate holes, said shaft means being disposed for engaging a bottom surface of said second gearing member so as to urge said first and second gear teeth into engagement and to release the engagement of said first and second gear teeth, according to the swinging movement of said tilt lever means.

2. A tilt type steering device as defined in claim 1, wherein a spring is provided between said second gearing member and said supporting bracket means and imparts to said second gearing member a elastic force tending to disengage said first and second gear teeth.

3. A tilt type steering device comprising:
   supporting bracket means fixed to a vehicle body;
   a steering column having one end which is pivotally supported from said supporting bracket means on a first lateral axis;
   a first gearing member fixed to a bottom portion of said steering column and having a convex bottom surface with first gear teeth formed along a circular arc around said first lateral axis;
   a second gearing member having one end which is pivotally supported from said supporting bracket means on a second lateral axis and another end having an upper surface with second gear teeth engageable with and disengageable from said first gear teeth;
   tilt lever means swingably movable for causing said first gear teeth and said second gear teeth to be brought into and out of engagement with each other;
   a pair of supporting plates fixed to opposite lateral sides of said first gearing member and each having an elongate hole with a lower edge forming a circular arc shape around said first lateral axis;
   a swing plate pivotally supported on the first lateral axis;
   shaft means connected to said swing plate for movement therewith and spanning said elongate holes, said shaft means being disposed for engaging a bottom surface of said second gearing member so as to urge said first and second gear teeth into engagement and to release the engagement of said first and second gear teeth, according to the movement of said swing plate;
   a hook plate having a base end pivotally supported on the second lateral axis and a hooked end engageable with and disengageable from said shaft means; and
   a guide pin connected to one of said hook plate and said tilt lever means and received in a guide slot of the other of said hook plate and said tilt lever means, said guide slot being configured to pivot said hook plate to engage with and disengage from said shaft means according to the swinging movement of said tilt lever means, said guide slot further being configured such that said hooked end of said hook plate engage said shaft means when said first and second gear teeth engage with each other.

4. A tilt type steering device as defined in claim 3, wherein a spring is provided between said second gearing member and said supporting bracket means and imparts to said second gearing member an elastic force tending to disengage said first and second gear teeth.

5. A tilt type steering device comprising:

supporting bracket means fixed to a vehicle body;

a steering column having one end which is pivotally supported from said steering bracket means on a lateral axis for pivotal movement;

a first gearing member fixed to a bottom portion of said steering column and having a convex bottom surface with first gear teeth formed along a circular arc around said lateral axis;

a second gearing member having one end which is pivotally supported from said supporting bracket means for pivotal movement parallel to that of said one end of said steering column, and another end having an upper surface with second gear teeth engageable with and disengageable from said first gear teeth;

tilt lever means swingably movable for causing said first gear teeth and said second gear teeth to be brought into and out of engagement with each other;

a pair of supporting plates fixed to opposite lateral sides of said first gearing member and each having an elongate hole with a lower edge forming a circular arc shape around said first lateral axis;

a swing plate pivotally supported from said supporting bracket means for pivotal movement parallel to that of said one end of said steering column;

shaft means connected to said swing plate for movement therewith and spanning said elongate holes, said shaft means being disposed for engaging a bottom surface of said second gearing member so as to urge said first and second gear teeth into engagement and to release the engagement of said first and second gear teeth, according to the movement of said swing plate;

a hook plate having a base end pivotally supported from said supporting bracket for pivotal movement parallel to that of said one end of said steering column and a hooked end engageable with and disengageable from said shaft means; and a guide pin connected to one of said hook plate and said tilt lever means and received in a guide slot of the other of said hook plate and said tilt lever means, said guide slot being configured to pivot said hook plate to engage with and disengage from said shaft means according to the swinging movement of said tilt lever means, said guide slot further being configured such that said hooked end of said hook plate engages said shaft means when said first and second gear teeth engage with each other.

6. A tilt type steering device as defined in claim 5, wherein a spring is provided between said second gearing member and said supporting bracket means and imparts to said second gearing member an elastic force tending to disengage said first and second gear teeth.

* * * * *